United States Patent Office 2,700,337
Patented Jan. 25, 1955

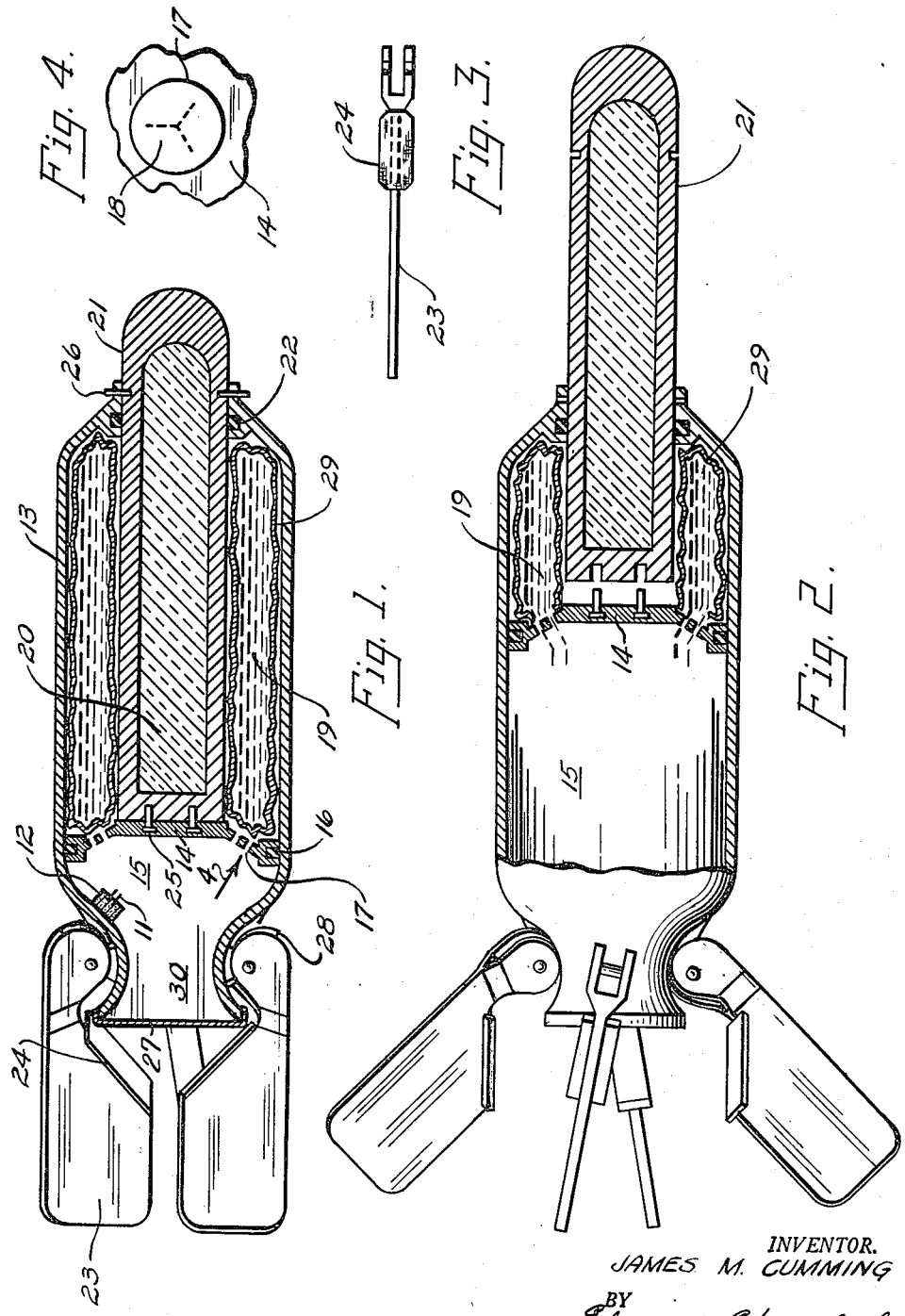

2,700,337

LIQUID PROPELLENT ROCKET

James M. Cumming, San Marino, Calif.

Application February 28, 1952, Serial No. 274,041

9 Claims. (Cl. 102—49)

(Granted under Title 35, U. S. Code (1952), sec. 266)

The invention described herein may be manufactured and used by or for the Government of the United States of America for governmental purposes without the payment of any royalties thereon or therefor.

The present invention relates to a liquid propellent rocket and more particularly to a liquid propellent rocket provided with a movable injector, the movement of which enlarges the combustion chamber and also forces liquid propellent into the combustion chamber.

In previously used methods the liquid propellent rockets have had the size of the combustion chamber held constant during the combustion process and required a separate pressurizing system to force liquids through the injector. Some of these previously used methods are:

1. A turbo-pump system; its disadvantages being that it requires costly apparatus not suitable for use in a small liquid propellent round.
2. Use of volatile liquid propellent components which depend upon their own vapor pressure for expulsion; its disadvantage being that it requires very high stresses in tank walls and severely limits the choice of liquids for propellents.
3. Use of a gas pressurizing system which may consist of:
   (a) A gas generator using a solid propellent,
   (b) A gas generator using a liquid propellent, or
   (c) A gas stored at high pressure and admitted to the propellent tanks to force the liquids out through the injector. Although gas pressurizing systems have appeared to be favorable for small rockets, they require costly devices and limit the space available for the storage of liquids.

The present invention overcomes the above-mentioned disadvantages by providing for a movable injector, the movement of which enlarges the combustion chamber so as to obtain maximum combustion efficiency, and causes injection of the liquid propellent into the combustion chamber, thereby eliminating a separate pressurizing or pumping system.

In my co-pending patent application, Serial No. 274,042, filed February 28, 1952, there is described a combination liquid and solid propellent rocket, the construction of which results in a comparatively long rocket. By telescoping the components as described in the present invention, a shorter more compact rocket is obtained.

An object of the present invention is to provide a simplified type of liquid propellent rocket suitable for mass production.

A further object of the invention is the provision of means to obtain maximum liquid loading of the rocket.

Still another object is to provide a liquid propellent rocket with an expansible combustion chamber so as to obtain maximum combustion efficiency.

Another object is to provide a simplified liquid propellent rocket that eliminates the use of gases stored at high pressures to inject the liquid propellent into the combustion chamber.

A final object of the present invention is to provide a liquid propellent rocket with a simplified injection system that does not require a separate pumping system.

Other claims and many of the attendant advantages of this invention will be readily appreciated as the same becomes better understood by reference to the following detailed description when considered in connection with the accompanying drawings in which:

Fig. 1 shows a sectional view of a preferred embodiment of the device before ignition of the propellent.

Fig. 2 is a side elevation, partly in section of the device during the combustion of the propellent.

Fig. 3 illustrates a view of a fin and its blast pad.

Fig. 4 is a fragmentary view of the injector plate in the direction of arrow, 4, of Fig. 1, and illustrates a typical burst diaphragm when used in place of the plastic bag container.

Referring now to the drawings, wherein like reference characters designate like or corresponding parts throughout the several views, there is shown in Fig. 1, an ignitor 11, to initiate the combustion of a gas producing element, such as a hypergolic liquid 12, both of which are located within a cylindrical body 13. Moving longitudinally inside said body is an injector partition 14, which forms a movable wall of a combustion chamber 15, which in turn is provided with an exhaust nozzle 30, protruding from the aft end of the body; said injector is provided with injector orifices or perforations 17 and aligning lugs 25, which slide into the base of a war-head 21 so as to make the war-head separable from the partition. The war-head, containing a high explosive 20, is temporarily secured to the outer cylindrical casing by retaining pins 26. The injector and the war-head are sealed by O-rings 16 and 22, respectively. A liquid propellent 19 is retained in a rupturable bag 29, such as a plastic or like bag, both of which are located in the chamber bounded by the movable injector plate, the cylindrical body and the war-head. In place of the plastic bag 29 the propellent may be retained in the aforesaid chamber by using burst diaphragms 18, as illustrated in Fig. 4, to seal the orifices 17, until forward movement of the injector 14 produces the required pressure to burst them. Stabilizing fins 23, provided with blast pads 24, are pivotally secured to said cylindrical casing, and are canted to the cylinder's planes of symmetry. The war-head 21 may be permanently fixed to the partition in which case the stabilizing fins need not be canted. A locking device 28 holds the fins when they reach a fully extended position. A closure diaphragm 27 may be placed over the exhaust nozzle to aid in building up the pressure to move the partition forward. After sufficient pressure has been built up in the combustion chamber, the closure diaphragm will burst or be blown off, thereby enabling the exhaust gas to propel the rocket.

With the foregoing in mind and referring to Figs. 1 and 2, the operation of the device is as follows:

After the war-head retaining pins 26 are removed and the gas producing element 12 is started by the igniter 11, the resulting force moves the injector plate and the warhead forward thereby bursting the bag 29 and the closure diaphragm 27. The forward action of the injector plate forces the liquid propellent 19 under pressure through the injector orifices 17, into the combustion chamber 15, where said liquid propellent is ignited. The combustion process in the chamber produces a flow of gases to provide the propelling force for the rocket and to move the stabilizing fins 23 outwardly into air-engaging position, where they are locked by the locking device 28. The blast pads 24, as illustrated in Fig. 3, are secured to the fins so as to provide a large striking surface for the exhaust gases at the start of the firing, and are rotated in a plane parallel to the rocket's center line when the fins are in fully extended position. The canted positions of the fins impart a spinning movement of the rocket and the warhead so that after the unit has reached the end of powered flight, the war-head having a smaller drag and a higher moment of inertia than the remainder of the rocket, will be projected from the unit toward the target, with a spinning motion.

It should be understood, of course, that the foregoing disclosure relates to only a preferred embodiment of the invention and that numerous modifications or alterations may be made therein without departing from the spirit and the scope of the invention as set forth in the appended claims.

Having thus described the invention, what is claimed is:

1. A rocket comprising a cylindrical body; a partition having perforations formed therein; said partition being longitudinally movable in said body and defining the injector end of an expansible combustion chamber; an exhaust nozzle at the aft end of the cylindrical body; a propellent chamber disposed forwardly of the perforated partition; a liquid propellent therein; and means for producing an initial pressure surge in the combustion chamber to move the partition forward to discharge the propellent through the perforations into the combustion chamber.

2. A rocket comprising a cylindrical body; a partition having perforations formed therein, said partition being longitudinally movable within the body and defining the injector end of an expansible combustion chamber; an exhaust nozzle at the aft end of the cylindrical body; a cylindrical war-head secured to the forward face of the partition and telescopically movable within the body; a propellent chamber disposed forwardly of the perforated partition; a liquid propellent therein; burst diaphragms which seal the perforations; and means for producing an initial pressure surge in the combustion chamber to move the partition forward to pressurize the propellent, to burst the diaphragms, and to discharge the propellent through the perforations into the combustion chamber.

3. A rocket comprising a cylindrical body; a partition having orifices and longitudinally movable within the body, thereby defining the injector end of an expansible combustion chamber; an exhaust nozzle at the aft end of the cylindrical body; a cylindrical war-head containing an explosive, and secured to the forward face of the partition so as to be telescopically movable within the body; a propellent chamber disposed forwardly of the partition between the war-head and the body; a liquid propellent in said propellent chamber; a gas producing element in the combustion chamber; a closure diaphragm placed over and secured to the exhaust nozzle of the combustion chamber to aid in building up pressure therein and which is blown away when the proper pressure is developed; an igniter to start said gas producing element to move the partition forward to discharge the propellent through the orifices into the combustion chamber.

4. A rocket comprising a cylindrical body; an injector plate having injector orifices and longitudinally movable within the body thereby defining the injector end of an expansible combustion chamber; an exhaust nozzle at the aft end of the body; a cylindrical war-head secured to the forward face of the plate and telescopically movable within the body; a propellent chamber disposed forwardly of the injector plate between the war-head and the body; a rupturable container located in said propellent chamber; a propellent retained in said container; a gas generating element located in the combustion chamber; an igniter to start the gas generating element to move the injector plate forward to discharge the propellent through the orifices into the combustion chamber.

5. A rocket comprising a cylindrical body; an injector plate provided with injector orifices and longitudinally movable within the cylindrical body thereby defining the injector end of an expansible combustion chamber; an exhaust nozzle at the aft end of the body; a cylindrical war-head secured to the forward face of the injector plate and telescopically movable within the body; a propellent chamber disposed forwardly of the injector plate between the war-head and the body; a rupturable bag located in said propellent chamber; a liquid propellent contained in said bag; a gas producing element located in the combustion chamber; an igniter to start the gas producing element to move the injector plate forward to discharge the propellent through the orifices into the combustion chamber.

6. A rocket comprising a cylindrical body; an injector plate provided with injector orifices and longitudinally movable within the cylindrical body thereby defining the injector end of an expansible combustion chamber; an exhaust nozzle at the aft end of the body; a cylindrical war-head separably related to the forward face of the injector plate and telescopically movable within the body; means to temporarily secure the war-head to the rocket body prior to firing; a propellent chamber disposed forwardly of the injector plate between the war-head and the body; burst diaphragms which seal the injector orifices; a propellent contained in said propellent chamber; a gas generating element located in the combustion chamber; a closure diaphragm placed over the exhaust nozzle of the combustion chamber to aid in building up pressure therein and adapted to be blown away when the pressure in the combustion chamber reaches a predetermined magnitude; an igniter to start the gas generating element to move the injector plate and the warhead forward, to break open the burst diaphragms, and to discharge the propellent through the orifices into the combustion chamber; fins pivotally secured to the after body in a canted attitude and moved outwardly into air-engaging position by the flow of gases from the combustion chamber; blast pads located on each fin to provide a large impinging surface for the exhaust gases; and means to lock the fins when they reach their extreme outward position, said fins causing the rocket body and the warhead to rotate about the longitudinal axis of the rocket body.

7. A rocket comprising a hollow cylindrical housing having an exhaust nozzle at one end and an opening at the other end, an injector partition having orifices therethrough and movably mounted in the housing, the space in the housing between the nozzle and one side of the partition forming a combustion chamber, a warhead, said warhead and said partition having means to position said warhead relative to said partition to prevent relative movement between them except in a direction parallel to the longitudinal axes of the housing, said warhead adapted to extend from and move through the opening in the housing, the space within the housing between the partition and the warhead forming a propellent chamber, a propellent in said chamber, means for increasing the pressure within the combustion chamber, said increased pressure initiating movement of said partition away from said nozzle, said movement pressurizing the propellent in the propellent chamber and forcing said propellent into the combustion chamber where it is ignited, the pressure derived from the burning of the propellent causing the partition to move until substantially all the propellent is forced into the combustion chamber, a plurality of fins pivotally mounted near the nozzle end of the housing, each of said fins having blast pads adapted to extend into the path of the exhaust gases of the combustion chamber escaping through the nozzle when said fins are in their retracted position, the reaction of the exhaust gases on said blast pads adapted to cause said fins to extend into an air engaging position, means for locking said fins in the air engaging position, said fins being canted to cause said rocket body to rotate about its longitudinal axis, whereby, when said rocket no longer develops thrust, said warhead separates from the rocket body and the spin imparted to the warhead by the rotation of the rocket body spin stabilizes the warhead.

8. A rocket as defined in claim 7 in which the propellent in said chamber is located within a rupturable bag.

9. A rocket as defined in claim 7 in which the orifices of the injector partition have burst diaphragms closing them.

References Cited in the file of this patent

UNITED STATES PATENTS

| | | |
|---|---|---|
| 2,444,957 | Skinner | July 13, 1948 |
| 2,465,401 | Skinner | Mar. 29, 1949 |